Dec. 23, 1952  S. F. STELMACK  2,622,659
AUTOMOBILE SEAT STRUCTURE
Filed Oct. 20, 1948  2 SHEETS—SHEET 1

Inventor
Stanley F. Stelmack

By Clarence A. O'Brien
and Harvey B. Jacobson
Attorneys

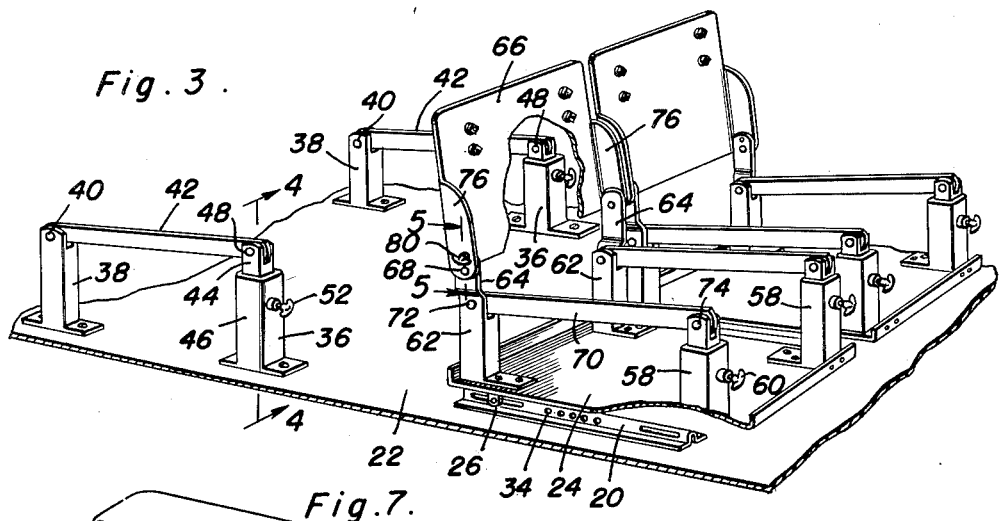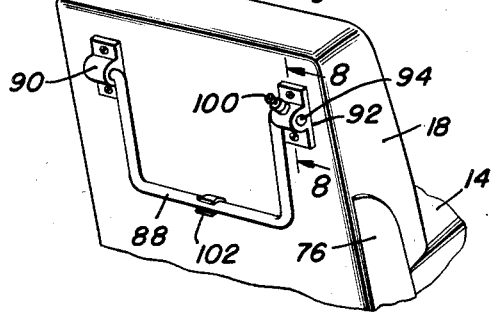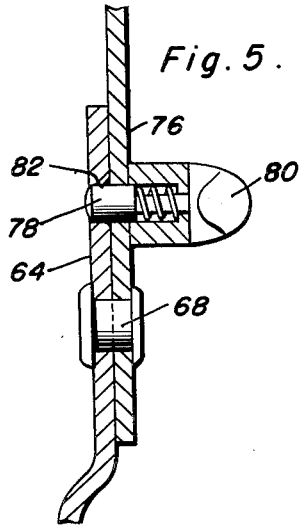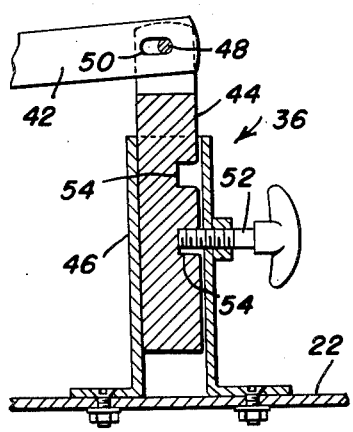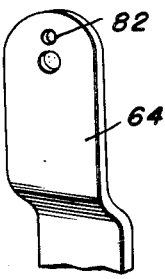

Patented Dec. 23, 1952

2,622,659

UNITED STATES PATENT OFFICE 2,622,659

AUTOMOBILE SEAT STRUCTURE

Stanley F. Stelmack, Plymouth, Pa.

Application October 20, 1948, Serial No. 55,566

1 Claim. (Cl. 155—99)

This invention relates to new and useful improvements and refinements in seat structures for automobiles, and the like, and the principal object of the invention is to provide a seat structure which may be quickly, easily and conveniently converted into a comfortable bed.

This object is achieved by lowering the back rest of the front seat to a horizontal position between the front and rear seat cushions, so that the back rests coact with the front and rear seat cushions in providing a substantially level bed.

However, inasmuch as the seat cushions are usually forwardly inclined, an important feature of the invention resides in the provision of means for leveling the seat cushions to the substantially horizontal plane of the lowered back rest.

Another feature of the invention involves the provision of means for supporting the back rest in its horizontal position, and further means for supporting the back rest in the upright position in which it is customarily disposed.

Some of the advantages of the invention reside in its simplicity of construction, and in its adaptability to vehicles of various sizes and types.

With the above more important objects and features in view, and such other objects and features as may become apparent as this specification proceeds, the invention consists essentially of the arrangement and construction of parts as illustrated in the accompanying drawings, in which:

Figure 3 is a fragmentary perspective view showing the arrangement of the seat supporting means;

Figure 4 is a cross sectional view, taken substantially on the plane of the line 4—4 in Figure 3;

Figure 5 is a cross sectional view, taken substantially on the plane of the line 5—5 in Figure 3;

Figure 6 is a fragmentary perspective view of one of the rear legs used in the invention;

Figure 7 is a perspective view showing the mounting of a combined hand rail and support used in the invention;

Like characters of reference are employed to designate like parts in the specification and throughout the several views.

Figure 1:
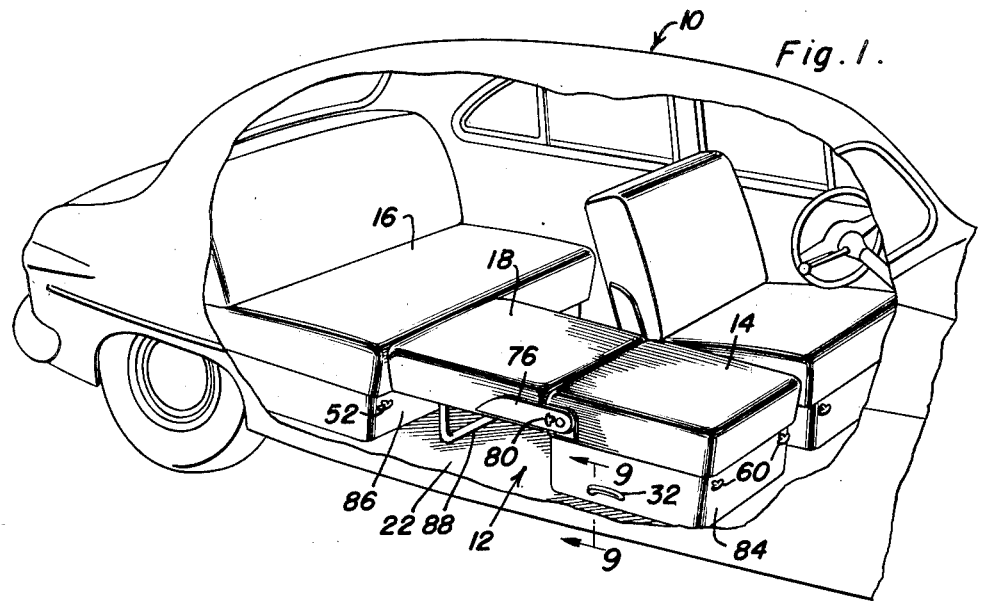
Figure 1 is a fragmentary perspective view of an automobile, partially broken away so as to illustrate the invention in situ therein.

Referring now to the accompanying drawings in detail, the reference character 10 designates an automobile generally, wherein is provided the invention designated generally by the reference character 12. The invention consists of the seat structure embodying a front seat cushion 14, a rear seat cushion 16 and a front seat back rest 18, as will be clearly apparent. While the arrangement shown in the accompanying drawings illustrates "dual" front seat units, the invention is equally adaptable for use on vehicles having only one front seat extending the full width of the vehicle body. However, in the arrangement shown, an additional advantage is realized by the possibility of converting only one of the front seat units into a bed to accommodate a passenger, while the second front seat unit may be used by the driver in the conventional manner, so that one person may drive while another sleeps.

In any event, the front seat unit is mounted upon suitable tracks 20 secured to the automobile floor 22, while a seat platform 24 is provided with downwardly extending brackets 26 which, in turn, are equipped with rollers 28 to engage the tracks 20. The mounting of the seat proper on the platform 24 will be hereinafter described, but it is to be noted that by virtue of the tracks 20 and rollers 28, the seat units may be slid forwardly and rearwardly in the vehicle body, more-or-less in accordance with conventional practice.

Figure 2:
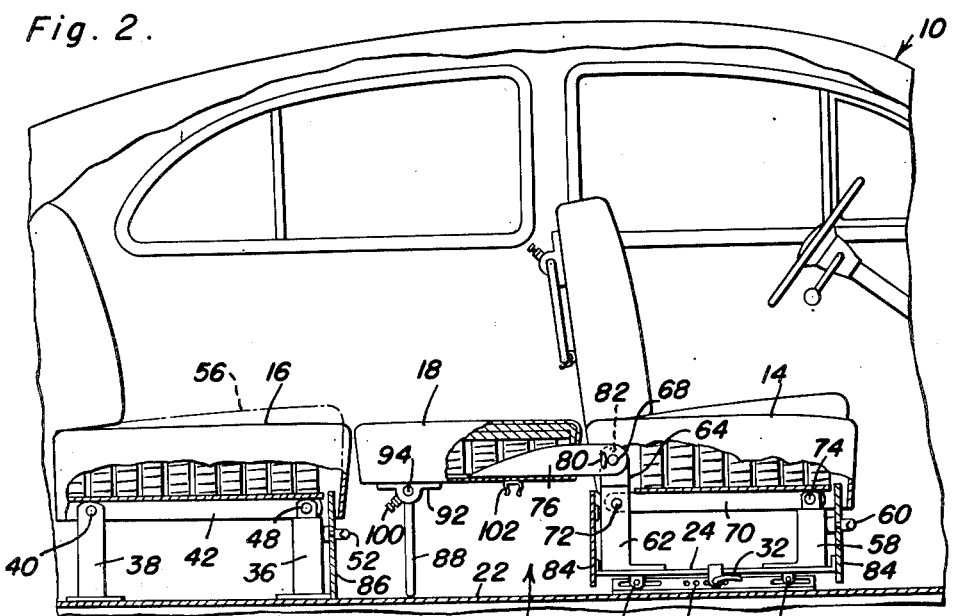
Figure 2 is a fragmentary side elevational view of the subject shown in Figure 1, the invention being partially broken away and shown in cross section.
Figure 9:
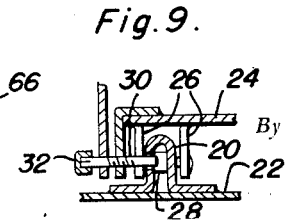
Figure 9 is a fragmentary cross sectional view, taken substantially on the plane of the line 9—9 in Figure 1.

A locking pin 30, equipped with a control handle 32 and selectively receivable in a plurality of apertures 34 formed in one of the tracks 20, is employed for releasably securing the seat unit in a predetermined position with respect to the tracks 20, as will be clearly apparent from Figures 2 and 9.

The rear seat unit, of course, is not slidable, and is secured directly to the floor 22 by front and rear legs 36, 38 respectively, the rear legs 38 simply assuming the form of upstanding brackets provided in their upper end portions with forked extremities to pivotally receive as at 40 one end portion of seat supporting rails 42 on which the rear seat cushion 16 is positioned, as shown in Figure 2.

Each of the front legs 36 consists of a pair of slidably telescoped sections, namely, the inner section 44 and the outer section 46 (best shown in Figure 4), the inner section 44 being provided at its upper end with a fork carrying a tranverse pin 48 which extends through a slot 50 formed in the aforementioned rails 42.

A locking screw 52 is provided in the outer section 46 and is releasably engageable with a vertical row of notches or recesses 54 provided in the inner section 44 substantially as shown. By virtue of this arrangement the inner section 44 may be slid upwardly in the outer section 46 of each of the front legs 36, so that the rear seat cushion 16 may assume its customary forwardly inclined position, as indicated at 56 in Figure 2. However, by simply releasing the locking screw 52 and engaging it with another of the recesses 54, the seat cushion 16 may be lowered to a substantially horizontal position, as shown.

The front seat cushion 14 is supported by front legs 58 which are very similar in construction to the aforementioned front legs 36, the raising and lowering thereof being controlled by the locking screws 60. The rear legs 62 of the front seat are similar to the aforementioned rear legs 38 but include upwardly projecting brackets or supports 64 to which is pivoted a back rest panel 66 as at 68. The seat supporting rails 70 are pivoted at 72, 74 to the respective legs 62, 58, and it will be noted that the front seat cushion 14 may be upraised to its forwardly inclined position or lowered to a horizontal position in the same manner as the rear seat cushion 16.

In effect, the aforementioned pivots 68 extend through suitable brackets 76 provided at the sides of the back rest panel 66, and a spring pressed plunger 78, controlled by a finger piece 80, is projectably and retractably mounted on one of the brackets 76 and is removably receivable in an aperture 82 formed in the bracket 64 of one of the rear legs 62. Matters are so arranged that when the back rest 18 is in its customary, substantially upright position, the plunger 78 is engaged with the aperture 82, so that the back rest is securely held. However, by simply pulling the finger piece 80 outwardly so as to disengage the plunger 78 from the aperture 82, the back rest 18 may be lowered or swung rearwardly and downwardly to a substantially horizontal position, as shown in Figure 1. In this position the back rest is disposed between the respective front and rear seat cushions 14, 16 and coacts therewith to provide a substantially flat bed, as will be clearly apparent. Needless to say, when the seat structure is to be converted into the bed, the front and rear seat panels should be lowered from their normal forwardly inclined positions to the horizontal plane of the lowered back rest, so that the bed is substantially flat as aforesaid.

It should, of course, be understood that the cushion of the back rest 18 is suitably secured to the back rest panel 66, and if desired, the supporting legs of the front and rear seat units may be suitably enclosed as at 84, 86 respectively, so as to achieve a "finished" appearance.

Means are provided for supporting the lowered back rest 18 in its horizontal position, these means consisting of a substantially U-shaped rail 88, the end portions of which are rotatably journaled in suitable brackets 90, 92 secured to the back rest panel 66.

Figure 8:
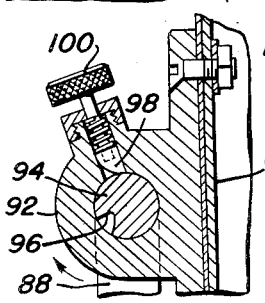
Figure 8 is a cross sectional view, taken substantially on the plane of the line 8—8 of Figure 7.

The end portion of the rail 88 which is rotatably journaled in the bracket 92 is best shown at 9 in Figure 8, wherein it will be noted that this end portion is formed with a recess 96 to releasably receive a spring pressed locking plunger 98 which is slidable in the bracket 92 and carries an externally disposed actuating knob 100. When the back rest 18 is in horizontal position as shown in Figure 2 and the rail 88 extends downwardly at right angles to the back rest, the plunger 98 is in engagement with the recess 96 and the rail 88 is locked in this position, wherein it rests upon the vehicle floor 22 and functions as an effective support for the horizontal back rest 18.

However, when the back rest 18 is upraised to its normal position as shown in Figure 7, the knob 100 may be pulled outwardly so as to disengage the plunger 98 from the recess 96, whereupon the member 88 will be permitted to swing freely on the upraised back rest, thus functioning as a convenient hand-rail for the rear seat passengers. However, a resilient clip 102 may be secured to the back rest panel 66 for the purpose of engaging and releasably holding the rail 88 against the back surface of the back rest, when the use of the hand rail is not required.

It is believed that the advantages and use of the invention will be clearly apparent from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

Adjustable automobile seat supporting means, comprising a pair of spaced rear legs, a pair of spaced front legs each including an outer section secured at its lower end to a supporting surface, an inner section slidably telescoped in the outer section whereby to vary the height of the front leg, said inner section being provided with a set of vertically spaced notches, a locking screw provided in the outer section and receivable selectively in said notches, and a pair of spaced seat supporting rails pivoted at the front and rear ends thereof to the inner sections of the front legs and to the upper ends of the rear legs, whereby said rails may be adjusted from a level to an inclined position.

STANLEY F. STELMACK.

REFERENCES CITED

The following references are of record in the file of this patent:

UNITED STATES PATENTS

| Number | Name | Date |
|---|---|---|
| 1,446,833 | Carlson | Feb. 27, 1923 |
| 1,838,199 | Thomas | Dec. 29, 1931 |
| 1,894,743 | Harter | Jan. 17, 1933 |
| 1,981,212 | Zeller | Nov. 20, 1934 |
| 2,177,202 | Berge | Oct. 24, 1939 |
| 2,297,176 | Thompson | Sept. 29, 1942 |
| 2,546,834 | Pfau | Mar. 27, 1951 |

FOREIGN PATENTS

| Number | Country | Date |
|---|---|---|
| 245,333 | Great Britain | Jan. 7, 1926 |
| 251,391 | Great Britain | May 6, 1926 |